(12) United States Patent
Young

(10) Patent No.: US 9,973,844 B1
(45) Date of Patent: May 15, 2018

(54) HEADPHONE STAND

(71) Applicant: William K. Young, Jonesboro, AR (US)

(72) Inventor: William K. Young, Jonesboro, AR (US)

(*) Notice: Subject to any disclaimer, the term of this patent is extended or adjusted under 35 U.S.C. 154(b) by 0 days. days.

(21) Appl. No.: 15/397,117

(22) Filed: Jan. 3, 2017

(51) Int. Cl.
| | |
|---|---|
| *A47F 7/00* | (2006.01) |
| *H04R 1/10* | (2006.01) |
| *F16M 11/22* | (2006.01) |
| *A47B 81/00* | (2006.01) |
| *H01R 25/00* | (2006.01) |
| *H02J 7/00* | (2006.01) |

(52) U.S. Cl.
CPC ........... *H04R 1/1091* (2013.01); *A47B 81/00* (2013.01); *A47F 7/0028* (2013.01); *F16M 11/22* (2013.01); *H01R 25/003* (2013.01); *H02J 7/0052* (2013.01); *H02J 2007/0062* (2013.01); *H04R 1/1025* (2013.01)

(58) Field of Classification Search
CPC ...... H04R 1/091; H04R 1/1025; A47B 81/00; A47B 61/04; F16M 11/22; H01R 25/003; H02J 7/0052; H02J 2007/0062; A47F 2007/0085; A47F 2097/003; A47F 7/146; A47F 7/00; A47F 5/04; A47F 5/05; A47F 7/0028; A47F 7/0035; A47F 7/0042; B65D 85/42; A47G 25/00; A47G 25/10; A47J 47/16
USPC ......... 211/26.2, 10, 13.1, 30, 41.7; 248/127, 248/146, 158, 176.1, 152, 346.01, 346.5; D14/224
See application file for complete search history.

(56) References Cited

U.S. PATENT DOCUMENTS

| | | | | |
|---|---|---|---|---|
| 1,747,628 | A * | 2/1930 | Hagel | A41H 17/00 211/13.1 |
| D135,982 | S * | 7/1943 | Morris | 211/13.1 |
| D159,960 | S * | 9/1950 | Davey | 15/246.4 |
| 3,442,393 | A * | 5/1969 | Koppelman | A47G 19/24 211/106 |
| 4,036,464 | A | 7/1977 | Olson | |
| 4,773,690 | A * | 9/1988 | Heinegg | A47J 43/07 206/373 |
| 4,799,744 | A * | 1/1989 | Toy | A47J 47/16 211/184 |
| 4,802,593 | A * | 2/1989 | Romanos | B43M 99/00 211/10 |

(Continued)

FOREIGN PATENT DOCUMENTS

WO    WO9745043    12/1997

*Primary Examiner* — Jennifer E. Novosad
(74) *Attorney, Agent, or Firm* — Goldstein Law Offices, P.C.

(57) ABSTRACT

A headphone stand, for supporting a variety of electronic devices and accessories, having a base portion and a tower portion. The tower portion is mounted on the top surface of the base portion and has a pair of parallel and substantially identical end plates, and a connecting part extending between the end plates. Each of the end plates has a plurality of fingers extending forwardly and rearwardly therefrom for supporting electronic devices and accessories. A plurality of upstanding walls extend upwardly from the base portion, defining slots for holding electronic devices. A USB hub provides a plurality of USB charging ports, such that charging cables can be used to charge various devices supported by the headphone stand.

14 Claims, 10 Drawing Sheets

(56) References Cited

U.S. PATENT DOCUMENTS

| | | | | |
|---|---|---|---|---|
| D323,753 S * | 2/1992 | Johnston | | D11/131 |
| 5,457,745 A * | 10/1995 | Wang | | B60R 11/0241 |
| | | | | 379/426 |
| 5,601,193 A * | 2/1997 | Santoya | | G09F 1/103 |
| | | | | 211/11 |
| 5,657,880 A * | 8/1997 | Birnbaum | | B42F 7/12 |
| | | | | 211/11 |
| 5,727,745 A | 3/1998 | Vara | | |
| 6,813,771 B2 * | 11/2004 | Weaver | | G11B 33/0438 |
| | | | | 720/600 |
| 7,311,210 B2 * | 12/2007 | Jones | | B43M 99/00 |
| | | | | 211/10 |
| D564,501 S * | 3/2008 | Rath | | D14/224 |
| 7,845,612 B2 | 12/2010 | Mase | | |
| D663,292 S * | 7/2012 | Hoggarth | | D14/224 |
| D682,550 S * | 5/2013 | Chun | | D3/294 |
| D684,145 S * | 6/2013 | Rath | | D14/206 |
| D691,581 S | 10/2013 | Mercs et al. | | |
| 8,763,818 B1 * | 7/2014 | Pargansky | | A47L 17/00 |
| | | | | 211/10 |
| 8,869,996 B1 * | 10/2014 | Christenson | | A47F 7/0028 |
| | | | | 211/119.009 |
| D720,718 S | 1/2015 | Stevinson | | |
| 8,966,684 B2 * | 3/2015 | Seehoff | | A47C 19/024 |
| | | | | 248/188.2 |
| 9,004,357 B2 | 4/2015 | Jackson | | |
| D780,490 S * | 3/2017 | James | | D6/682 |
| 2004/0190238 A1 * | 9/2004 | Hubbard | | F16M 11/046 |
| | | | | 361/679.09 |
| 2005/0103957 A1 * | 5/2005 | Chang | | F16M 11/22 |
| | | | | 248/127 |
| 2006/0011564 A1 * | 1/2006 | Hatzis | | A47B 63/00 |
| | | | | 211/10 |
| 2008/0017596 A1 * | 1/2008 | Brock | | A45D 33/26 |
| | | | | 211/10 |
| 2011/0132856 A1 * | 6/2011 | Meeks | | A47F 3/14 |
| | | | | 211/85.3 |
| 2013/0233816 A1 * | 9/2013 | Greenfield | | A47B 81/02 |
| | | | | 211/85.3 |
| 2014/0153182 A1 * | 6/2014 | North | | G06F 1/1632 |
| | | | | 361/679.41 |
| 2014/0175031 A1 * | 6/2014 | Roberts | | H02J 7/0027 |
| | | | | 211/26.2 |
| 2015/0263547 A1 * | 9/2015 | Browne | | H02J 7/0027 |
| | | | | 320/103 |
| 2016/0066076 A1 | 3/2016 | Schatt | | |
| 2016/0190838 A1 * | 6/2016 | Webb | | H02J 7/0044 |
| | | | | 320/115 |
| 2017/0215556 A1 * | 8/2017 | Sullivan | | A45D 44/06 |
| | | | | 211/26 |

\* cited by examiner

HEADPHONE STAND

TECHNICAL FIELD

The present disclosure relates generally to a headphone stand. More particularly, the present disclosure relates to a device for holding headphones and other digital accessories while they are not in use.

BACKGROUND

A long way from the monophonic earphone used to listen to the ubiquitous transistor radio of days past, modern headphones have become a central part of our electronic device culture. Just as the devices themselves have become our own personal world as we move about our day, our headphones have become the way we listen to audio and video content of all kinds. Equipped with a microphone, they also allow us to have hands-free conversations and video conferences—as well as record content with our smartphones.

Because of the value they provide in our everyday electronic device experience, it has become acceptable and expected for an individual to spend a considerable amount on not just one set of headphones, but often on several. Earbuds, traditional headphones, noise cancelling headphones for travel, wireless ear pieces, wireless headphones, telephonic headsets, and other variations often sit side by side in our arsenal—but also often lay side by side in a pile when not in use.

Perhaps second only to the convenience these headphones provide, is the inconvenience of storing them. Cords quickly get tangled. Components get lost. Our expensive headphones can easily fall off a table, behind a desk or night stand, get lost, stepped on, washed in laundry, and thereby damaged and destroyed. Even when they are not damaged or lost but simply mislaid—we can still waste a great deal of time looking for them.

In addition to the poor solutions currently available for storing headphones when not in use, there are few effective solutions for charging headphones. Typically you connect one end of the cable to the headphones, the other end to a wall outlet or USB port, and just set the headphones on the nearest surface—or worse, let them dangle. What's more, no effective solution exists for charging headphones alongside the devices they are commonly used with.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide an effective solution for safely storing headphones when not in use, to prevent them from being lost or damaged. Accordingly, the present disclosure provides a headphone stand that is configured for holding headphones, ear buds, earphones, headsets, and related devices. The stand is configured to hold multiple devices, keeping them safe and their cords tangle free, such that they are immediately ready for use when wanted.

It is another aspect of an example embodiment in the present disclosure to provide an effective solution that combines safe storage of headphones and related devices with the ability to charge them while not in use. Accordingly, charging ports and neat cord routing is provided by the stand to facilitate convenient charging of headphones as well as related devices, including phones, watches, and tablets.

Accordingly, the present disclosure describes a headphone stand, for supporting a variety of electronic devices and accessories, having a base portion and a tower portion. The tower portion is mounted on the top surface of the base portion and has a pair of parallel and substantially identical end plates, and a connecting part extending between the end plates. Each of the end plates has a plurality of fingers extending forwardly and rearwardly therefrom for supporting electronic devices and accessories. A plurality of upstanding walls extend upwardly from the base portion, defining slots for holding electronic devices. A USB hub provides a plurality of USB charging ports, such that charging cables can be used to charge various devices supported by the headphone stand.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
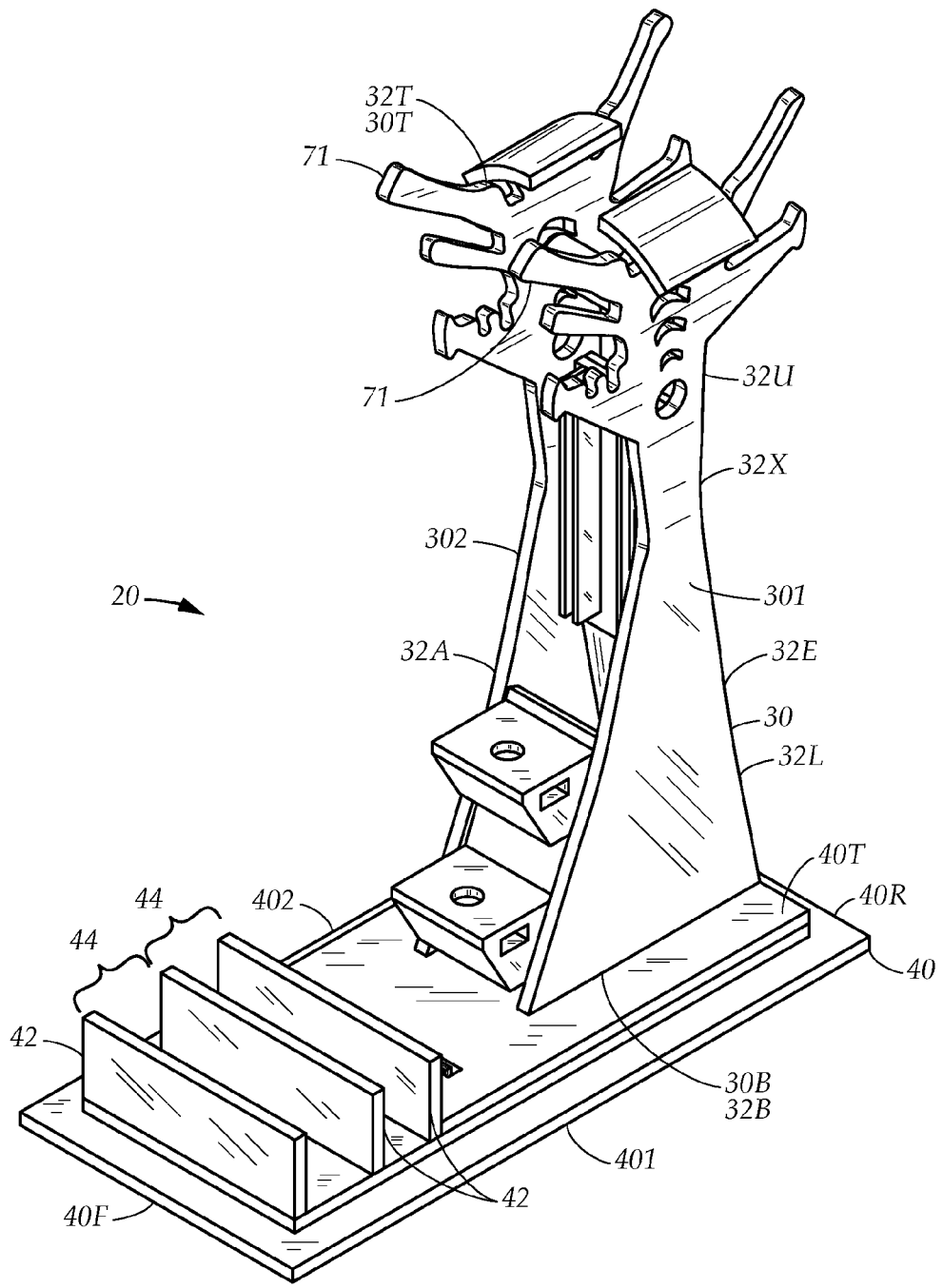
FIG. 1 is a diagrammatic perspective view, illustrating the headphone stand according to the present disclosure, per se.
Figure 2:
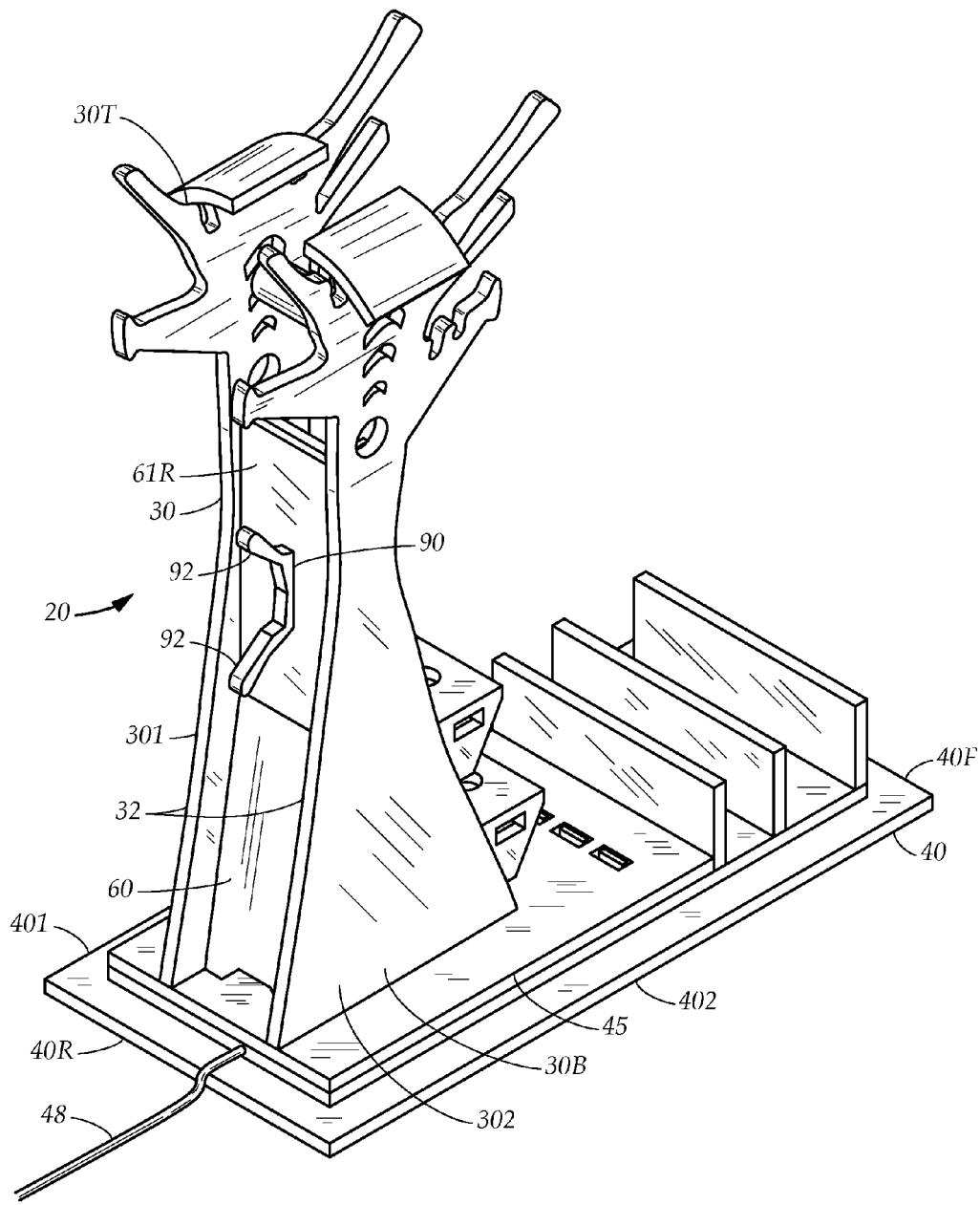
FIG. 2 is a diagrammatic perspective view, illustrating an alternate angle of the headphone stand according to the present disclosure, per se.

FIG. 1 and FIG. 2 illustrate a headphone stand 20, having a tower portion 30 and a base portion 40. The tower portion 30 has a top 30T and a bottom 30B; a front 30F, and rear 30R; a first side 301 and a second side 302. The base portion 40 has a top surface 40T and a bottom surface 40B; and a first side 401 and a second side 402. The bottom 30B of the tower portion 30 is mounted to the top surface 40T of the base portion.

The base portion 40 has a front 40F, a rear 40R and has several upstanding walls 42 that extend transversely on the top surface 40T near the front. The upstanding walls extend nearly between the first side 401 and second side 402 of the base portion 40. The upstanding walls 42 define at least two device slots 44 therebetween.

The tower 30 includes a pair of end plates 32 that are substantially symmetrical and substantially flat, and a connecting part 60 that extends between and connects the end plates 32. The connecting part 60 has several subcomponents that will be described hereinbelow. The end plates 32 have a lower part 32L having a bottom edge 32B, a leading edge 32A, and a trailing edge 32E. The end plates 32 also have an upper part 32U having a top 32T, and a transition portion 32X between the upper part 32U and lower part 32L.

The upper end 32U of both plates 32 have a plurality of holding adaptations that are configured to together hold a variety of items as will be described in further detail hereinbelow. In particular, as seen best in FIG. 4, each of the plates 32 has a top front finger 71 that extends forwardly from the upper part 32U, and a top rear finger 72 that extends rearwardly from the upper part 32U. The top front fingers 71 of the plates 32 may be used together to provide a cradle for supporting a device thereacross, and also to wind cords. Similarly, the top rear fingers 72 may be used together to cradle a device, wind cords, and the like.

A pair of arced pads 73 are located at the top 32T of the end plates 32, each between the top front finger 71 and top rear finger 72 of that end plate 32. The arced pads may be substantially rectangular but are curved around a longitudinal axis of the headphone stand 20. The arced pads 73 are spaced apart from each other but are curved in the transverse direction so that they substantially follow a continuous curve, so that they are well adapted for supporting a curved item thereupon. In particular, referring momentarily to FIG. 7, a pair of headphones 200 are being supported by the headphone stand 20. In particular, the headphones 200 have a pair of earpads 201 that are connected by an arcuate main band 202. As illustrated, the main band 202 extends across the arced pads 73, thereby supporting the headphones 200 on the stand 20 with each of the earpads 201 located alongside one of the plates 32.

Figure 11:
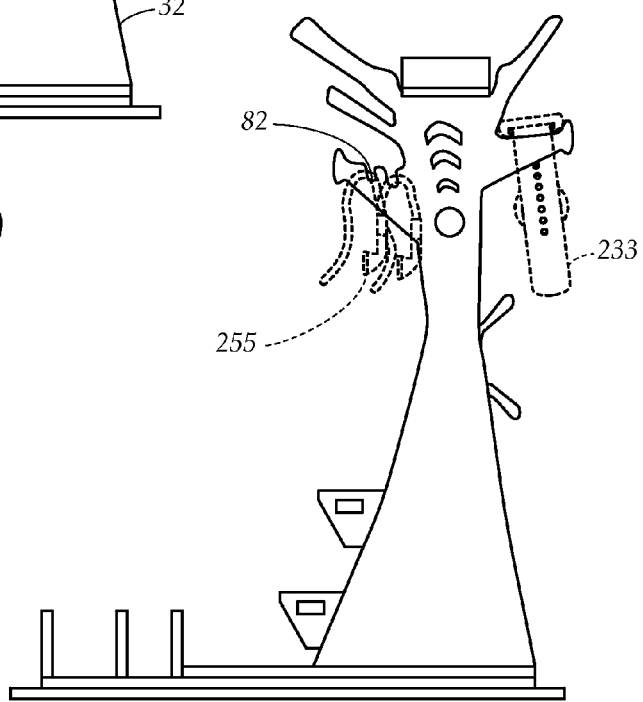
FIG. 11 is a side elevational view, illustrating additional storage options for earbuds and the watch made possible by structure of the headphone stand.

Several of the fingers, especially the rear mid fingers 75 and the front lower finger 76 may have a hooked end 80 fully opposite from the upper part 32U of the plate from which it extends. The hooked end 80 facilitates cord wrapping around its associated finger, and prevents the device and cordage from slipping off of said finger. In addition, notches 82 are provided in some of the fingers, such as the front lower finger 76 to further facilitate cord wrapping in a manner that helps the cord stay put once wrapped. As illustrated in FIG. 11, the notches 82 in the front lower finger 76 can also aid in supporting earbuds 225 at the front lower finger 76. In addition, the notches 82 can also serve as convenient pathway for a charging cord 300 coming from inside the tower portion 30 (see FIG. 3) toward a destination outside or along the tower portion 30.

Referring again to FIG. 4, other provisions are made on the upper part 32U of the plates 32 for supporting devices. In particular, a pair of mid front fingers 74 extend forwardly from the upper part 32U, below the top front fingers 71; and a pair of lower rear fingers 75 extends rearwardly from the upper part, below the top rear fingers 72. The plates 32 also each have a front lower finger 76 that extends forwardly from the upper part 32U. The front lower finger 76 preferably extends substantially horizontally, while the top front finger 71, the top rear finger 72, the mid front finger 74, and the lower rear finger 75 all are angled to extend outwardly and upwardly.

Figure 3:
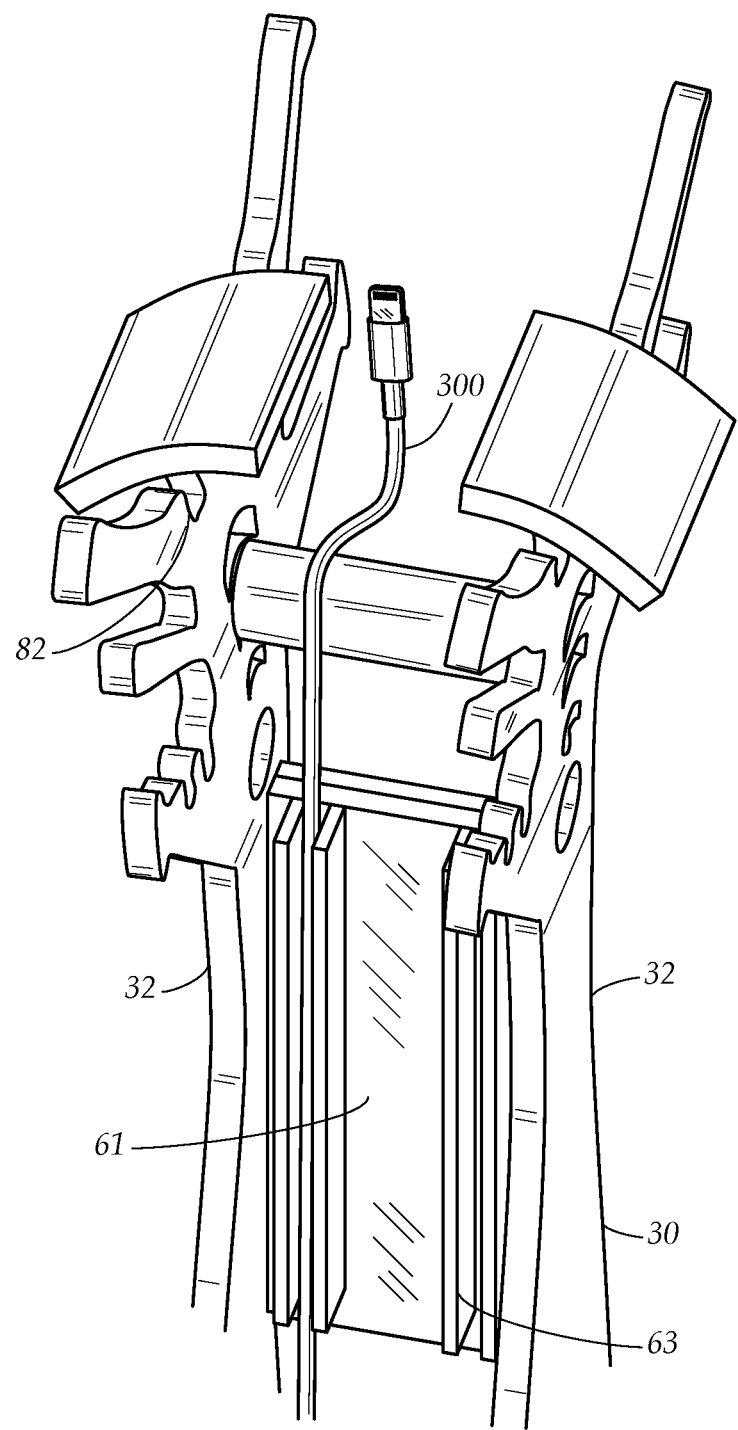
FIG. 3 is a diagrammatic perspective view, illustrating cord routing to the top of the tower portion of the headphone stand.
Figure 4:
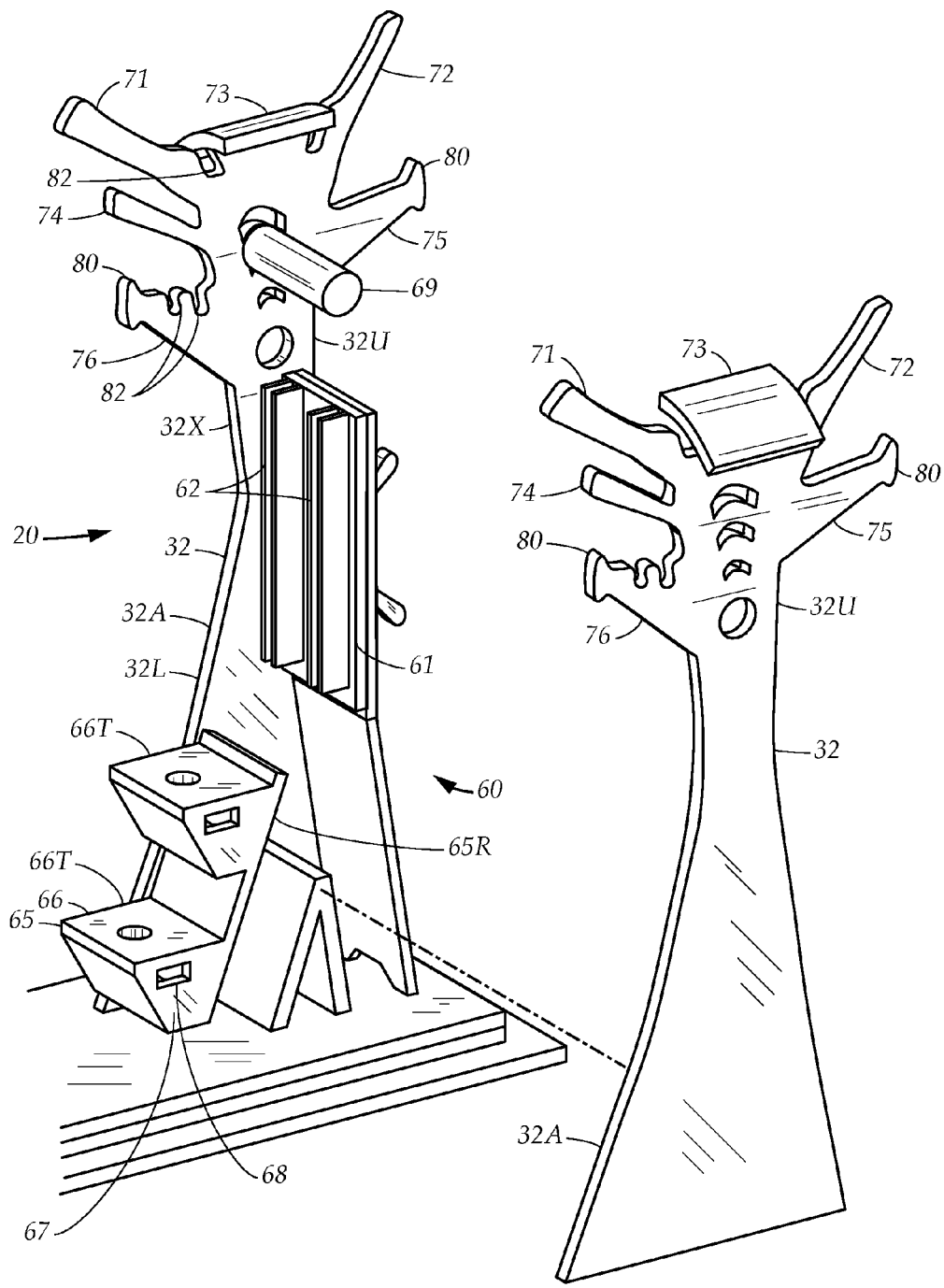
FIG. 4 is an exploded view, illustrating construction of the tower portion using two matching plates.
Figure 5:
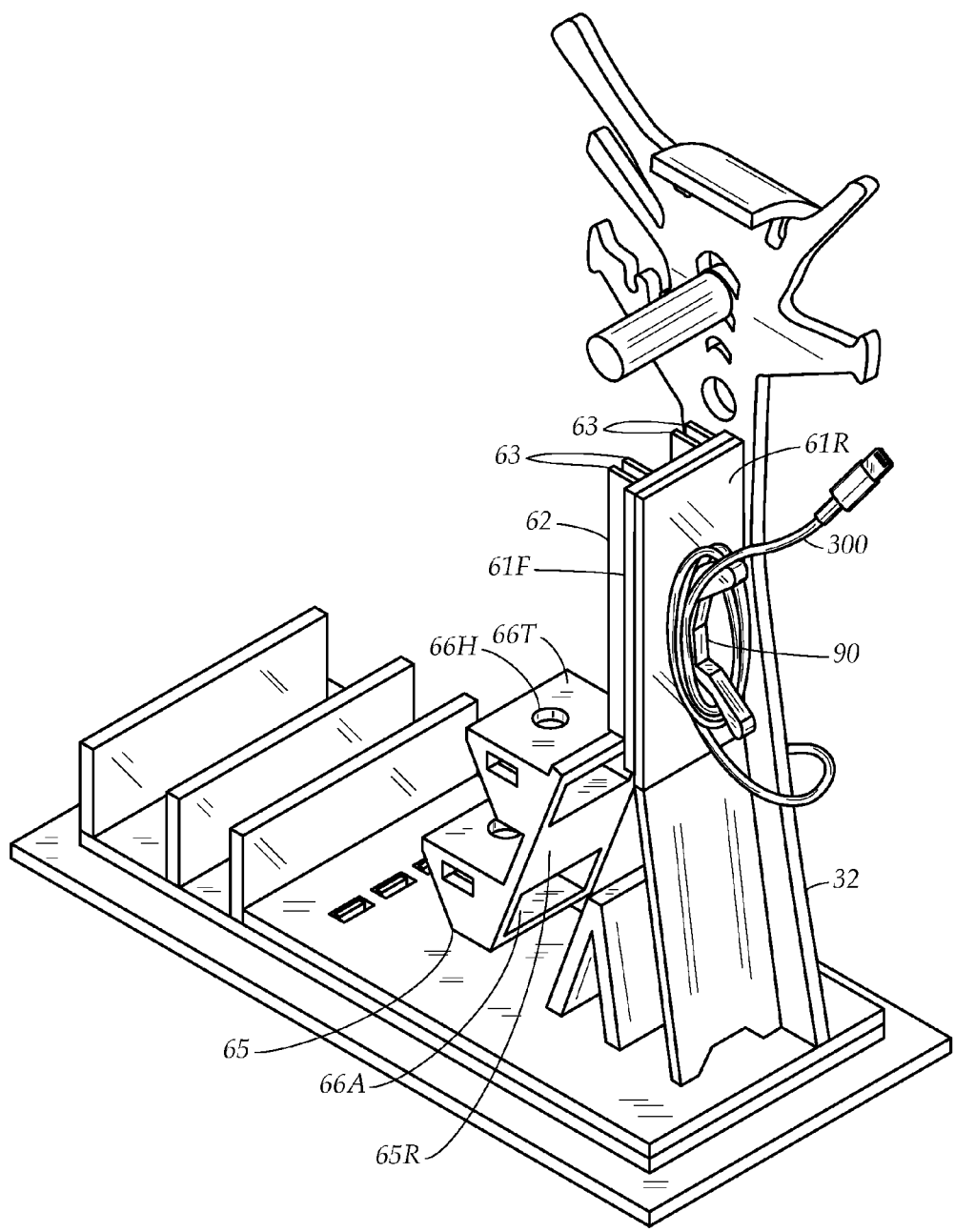
FIG. 5 is a diagrammatic perspective view, illustrating the tower portion with one of the matching plates removed to illustrate cable management functionality and features provided by the stand.

Subcomponents of the connecting part 60 are seen in FIG. 4, including a cord routing plate 61 that extends vertically between the end plates 32 at the lower part 32L and transition part 32X of each end plate 32. Referring to FIGS. 3, 4 and 5, the cord routing plate 61 has a front 61F and rear 61R. A parallel pair of cord channels 62 extend vertically on the front 61F, each cord channel defined by a pair of parallel ribs 63 and extending near and substantially parallel to one of the end plates 32. The ribs 63 are adapted to flex to accept and hold one of the charging cables 300, and thereby allow charging cables to extend vertically through the tower portion 30. As seen in FIG. 2 and FIG. 5, a cord reel 90 is located on the rear 61R of the cord routing plate 61. The cord reel 90 includes a pair of arms 92, one of said arms extending rearwardly and upwardly and the other of said arms extending rearwardly and downwardly. As illustrated in FIG. 5, the cord reel 90 provides a convenient place to wrap one of the charging cords 300 to keep it out of the way, or may be used to wrap and store any other cord.

Figure 7:
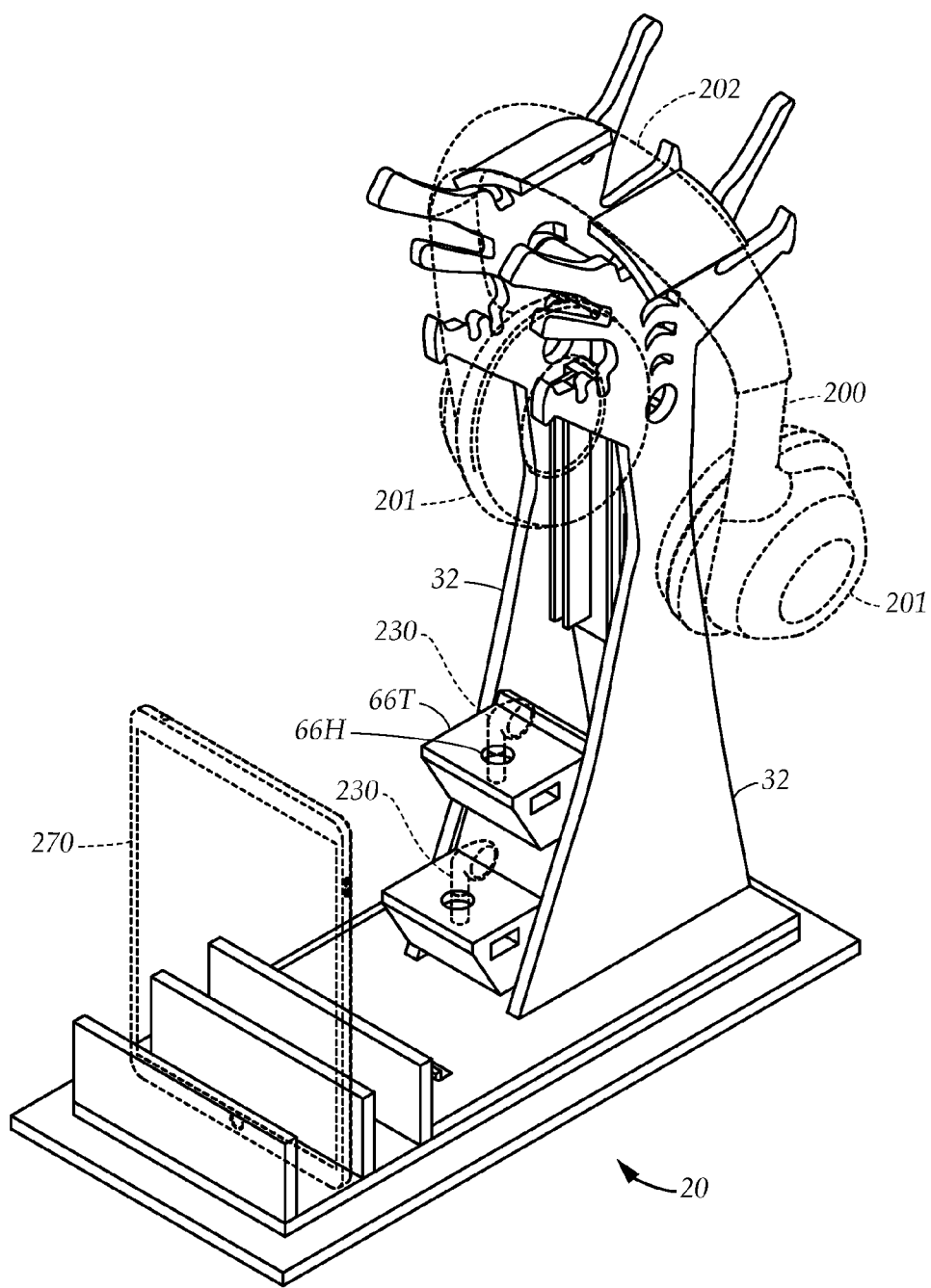
FIG. 7 is a diagrammatic perspective view, showing the headphone stand in use, with headphones, earbuds, and a table stored thereon.
Figure 8:
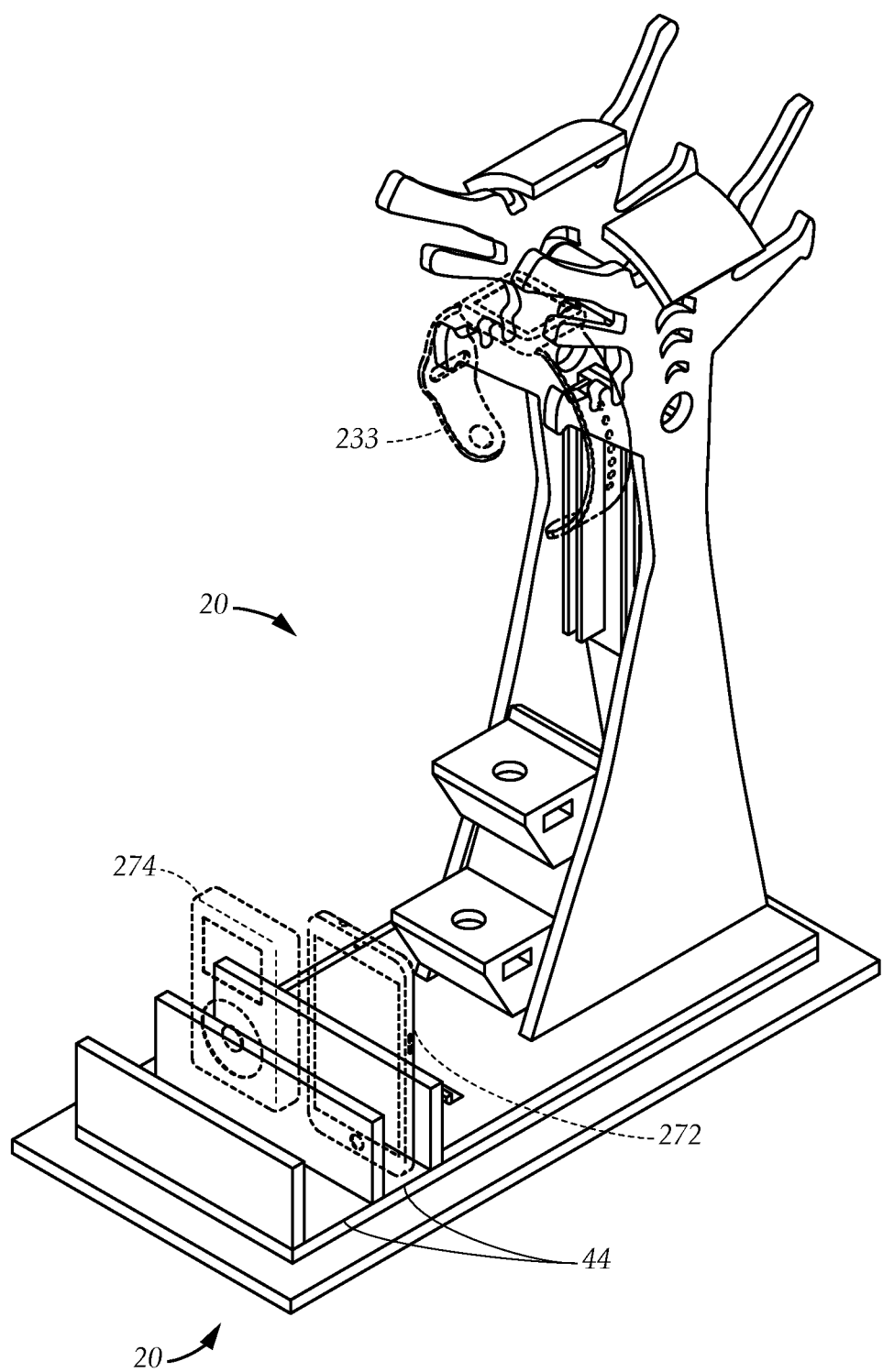
FIG. 8 is a diagrammatic perspective view, also showing the headphone stand in use, with watch, phone, and MP3 player devices being stored thereon.
Figure 9:
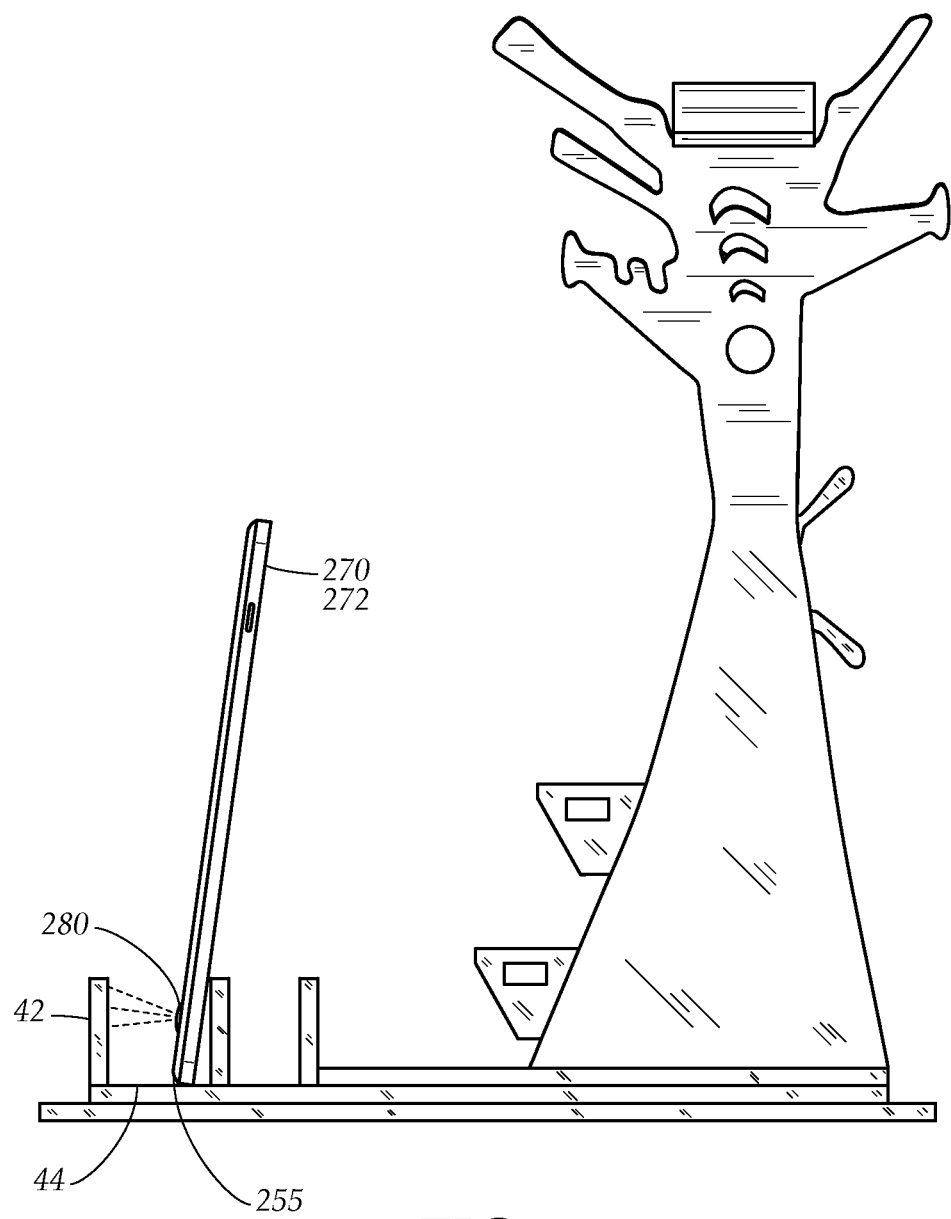
FIG. 9 is a side elevational view, illustrating a phone or tablet being stored on the stand, wherein the camera is blocked by a portion of the stand.

Referring to FIGS. 4 and 5, additional components of the connecting part 60 include a staircase assembly 65 having a rear panel 65R that follows the leading edge 32A of both end plates 32, the staircase assembly 65 also having a pair of staggered steps 66 that are each attached to and extend horizontally from the rear panel 65R. Each step 66 has a tread 66T that extends horizontally and a pair of side panels 67 extending downwardly from the tread 66T alongside that step 66. Each step 66 has a hollow interior cavity 66A. At least one of the side panels 67 associated with each step has a rectangular opening 68 therethrough. The rectangular openings 68 are sized and configured to allow USB cords/plugs to be fed or extended through said openings 68, and into the hollow interior cavity 66A so that the steps 66 may be used for cord storage for any of a variety of devices. The steps 66 may have openings in front of the tread 66A or at the rear panel 65R to facilitate convenient storage or to facilitate removal of cords that are fed too far through one of the rectangular openings 68. In addition a rest hole 66H is provided in the tread 66T to allow a wireless earpiece 230 (such as a BLUETOOTH earpiece, wireless earbuds, or the like) to be conveniently stored, as seen in FIGS. 7 and 9.

Figure 10:
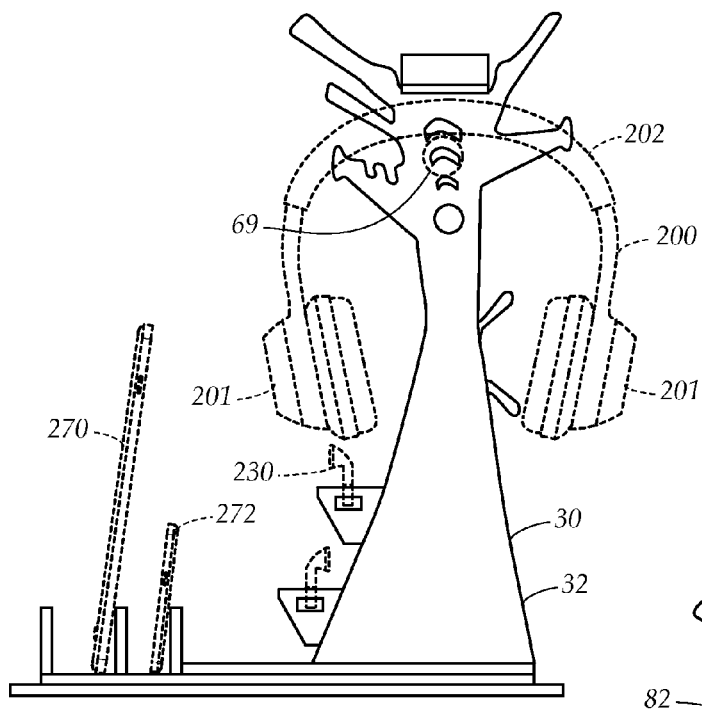
FIG. 10 is a side elevational view, illustrating an alternate position for headphone storage made possible by structure of the headphone stand.

The connecting part 60 further includes a connecting cylinder 69 that extends between the end plates 32 near the top 32T and below the arced pads 73. The connecting part is a rod-like element, extending transversely within the tower portion 30 that is adapted for, among other things, supporting a headphone main band 202 substantially parallel to the end plates 32 with its earpads in front of and behind the tower portion 30. In this way, at least two traditional headphones 200 can be held simultaneously by the stand 20: one in the position shown in FIG. 10, and another extending perpendicularly above in the position shown in FIG. 7.

Figure 6:
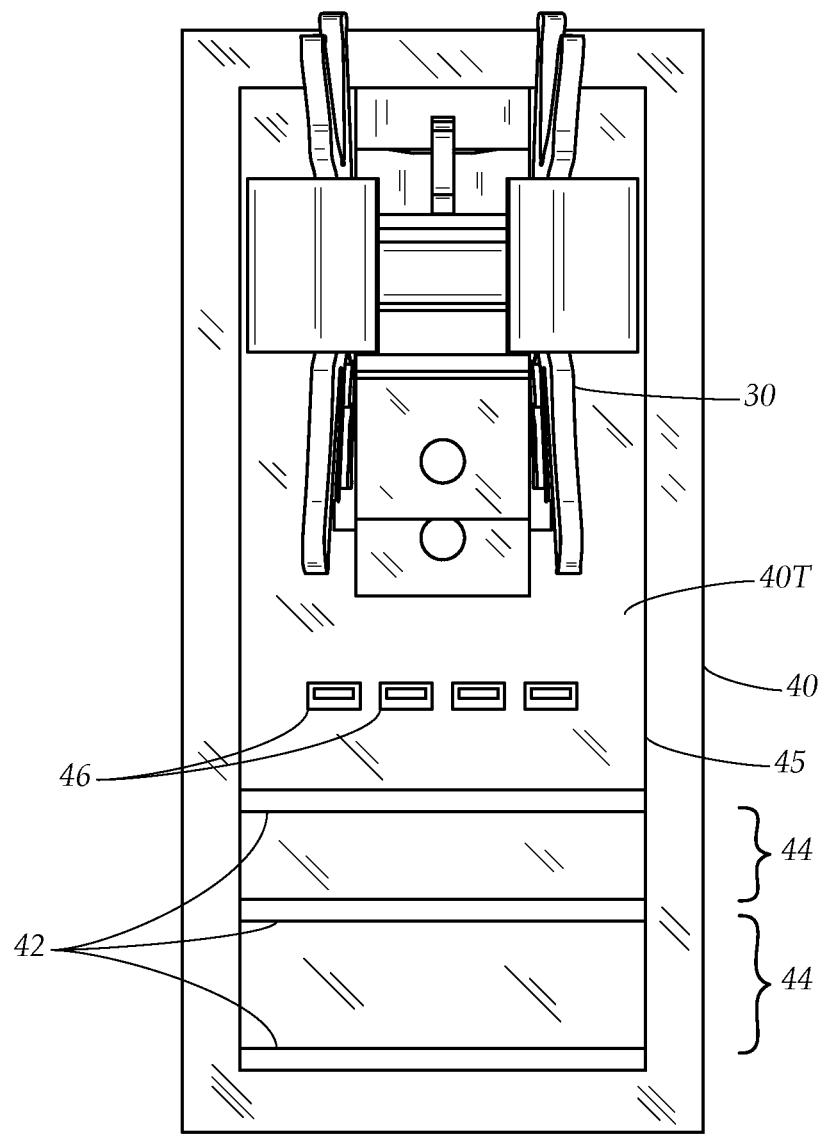
FIG. 6 is a top plan view of the headphone stand.

Referring now to FIG. 6, it can be seen that the upstanding walls 42 are spaced unevenly, such that two of the adjacent upstanding walls 42 are closer together. Accordingly one of the slots 44 is larger than the other slot. In this way, the slots 44 are adapted for accommodating different sized smartphones and tablets. Also seen in FIG. 6, a USB hub 45 is contained within the base 40. The USB hub has a plurality of upwardly oriented USB ports 46 provided in the top surface 40T of the base portion 40 between the tower portion 30 and the upstanding walls 42. Note that the USB hub is preferably a charging hub, providing suitable charging current to devices that are plugged into the USB ports 46, in accordance with the USB specifications. Referring again to FIG. 2, power may be provided to the USB hub 45 by a power cord 48.

While the possibilities for storing a variety of electronic devices using the headphone stand as described are nearly endless, a few variations, permutations, and features are worth noting now. In particular, with reference to FIG. 7 through FIG. 11, tablets 270, smartphones 272, and MP3 players 274 may be conveniently stored in the slots 44 provided by the upstanding walls 42. Headphones 200, earbuds 205, wireless earpieces 230, and watches 233 may also be stored. Many of these devices have one or more built in cameras 280. Since such cameras are potentially vulnerable to privacy, the headphone stand 20 can be used to effectively prevent invasion of the user's privacy if their device is hacked, and the camera 280 is accessed. In particular, as illustrated in FIG. 9, if the camera is located near a first end 255 of the device 270, 272. If that device 270, 272 is stored within one of the slots 44, with its camera oriented toward one of the upstanding walls 42 as illustrated, then no invasion of privacy will occur.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a headphone stand for supporting a variety of electronic devices, such as headphones, earphones, earbuds, smartphones, tablets, and watches. The disclosure is illustrated by example in the drawing figures, and throughout the written description. It should be understood that numerous variations are possible, while adhering to the inventive concept. Such variations are contemplated as being a part of the present disclosure.

What is claimed is:

1. A headphone stand, for supporting headphones having a main band and a pair of earpads, and also for supporting, earbuds, smartphones, and tablets and associated charging cables, comprising:
  a base portion having a bottom surface adapted for resting upon a horizontal surface and a top surface, a plurality of upstanding walls extending upwardly from the top surface and defining at least two slots between said upstanding walls for holding the smartphones and the tablets; and
  a tower portion attached to the base portion and extending upwardly therefrom, the tower portion having a front and a rear and including a pair or substantially identical end plates and a connecting part extending between the end plates, the end plates each having an upper part, a lower part, and a transition part between the upper part and lower part, the upper part having a top and having a top front finger extending forwardly near the top, a top rear finger extending rearwardly near the top, a lower rear finger extending rearwardly below the top rear finger, and a lower front finger extending forwardly below the top front finger, wherein the top front finger, the top rear finger, and the lower rear finger are angled upwardly, and the lower front finger extends substantially horizontally, and wherein said fingers of each plate extend in substantially the same plane, and further comprising a pair of arced plates, each attached to the top of one of the end plates and curved transversely in a continuous curve such that the arced plates are adapted for supporting the headphone main band extending between the end plates with the earpads adapted to be located alongside each of the end plates.

2. The headphone stand as recited in claim 1, further comprising a USB hub located within the base portion, having a plurality of upwardly oriented USB ports provided in the top surface of the base portion between the tower portion and the upstanding walls, and wherein the connecting part includes a cord routing plate extending vertically between the end plates at the lower part and the transition part of each end plate, the cord routing plate having a front and rear and a parallel pair of cord channels extending vertically on the front, each cord channel defined by a pair of parallel ribs and extending near and substantially parallel to one of the end plates and adapted for accepting and allowing the charging cables to extend vertically through the tower portion.

3. The headphone stand as recited in claim 2, wherein the end plates have a leading edge at the front and a trailing edge at the rear, and wherein the connecting part includes a staircase assembly having a rear panel that follows the leading edge of both end plates, the stair case assembly also having a pair of staggered steps that are each attached to and extend horizontally from the rear panel, each step having a pair of side panels extending downwardly from the step, at least one of the side panels associated with each step has a rectangular opening therethrough.

4. The headphone stand as recited in claim 3, wherein at least one of the fingers of each end plate has a hooked end and at least one notch.

5. The headphone stand as recited in claim 4, wherein the connecting part further includes a connecting cylinder, extending between the end plates near the top and below the arced plates, the connecting part adapted for supporting the headphone main band substantially parallel to the end plates.

6. The headphone stand as recited in claim 5, further comprising a cord reel on the rear of the cord routing plate, the cord reel including a pair of arms, one of said arms extending rearwardly and upwardly and the other of said arms extending rearwardly and downwardly.

7. The headphone stand as recited in claim 6, wherein the upstanding walls are spaced unevenly so that one of the slots is larger than another of the slots so that they are adapted for accommodating different sized smartphones and tablets.

8. A headphone stand, for supporting at least two sets of headphones each having a main band and a pair of earpads, and also for supporting earbuds, smartphones, and tablets and associated charging cables, comprising:
  a base portion having a front, a rear, and a bottom surface adapted for resting upon a horizontal surface and a top surface, a plurality of upstanding walls extending upwardly from the top surface near the front of the base portion and defining at least two slots between said upstanding walls for holding the smartphones and the tablets, the base portion having a USB hub having a plurality of USB ports in the top surface; and
  a tower portion attached to the base portion near the rear of the base portion and extending upwardly therefrom, the plurality of USB ports extending between the tower portion and the upstanding walls, the tower portion having a front and a rear and including a pair or substantially identical end plates and a connecting part extending between the end plates, the end plates each having an upper part, a lower part, and a transition part between the upper part and lower part, the upper part having a top and having a top front finger extending forwardly near the top, a top rear finger extending rearwardly near the top, and wherein said fingers of each plate extend in substantially the same plane, and further comprising a pair of arced plates, each attached to the top of one of the end plates and curved transversely in a continuous curve such that the arced plates are adapted for supporting one of the at least two sets of headphones with its headphone main band extending substantially perpendicular to the end plates with the earpads located alongside each of the end plates, wherein the connecting part includes a connecting cylinder, extending between the end plates near the top of the end plates and below the arced plates, the connecting cylinder adapted for supporting the headphone main band of the other of the at least two sets of headphones substantially parallel to the end plates with its earpieces in front and behind the tower portion, immediately below and perpendicular to the headphones supported by the arced plates.

9. The headphone stand as recited in claim 8, wherein the end plates have a leading edge at the front and a trailing edge at the rear, and wherein the connecting part includes a staircase assembly having a rear panel that follows the leading edge of both end plates, the stair case assembly also having a pair of staggered steps that are each attached to and extend horizontally from the rear panel, each step having a pair of side panels extending downwardly from the step, at least one of the side panels associated with each step has a rectangular opening therethrough, and wherein each step has a horizontally extending tread that has a rest hole extending vertically therethrough, the resting hole adapted for supporting a wireless earpiece.

10. The headphone stand as recited in claim 9, wherein the connecting part includes a cord routing plate extending vertically between the end plates at the lower part and the transition part of each end plate, the cord routing plate having a front and rear and a parallel pair of cord channels extending vertically on the front, each cord channel defined by a pair of parallel ribs and extending near and substantially parallel to one of the end plates and adapted for accepting and allowing the charging cables to extend vertically through the tower portion.

11. The headphone stand as recited in claim 10, further comprising a cord reel on the rear of the cord routing plate, the cord reel including a pair of arms, one of said arms extending rearwardly and upwardly and the other of said arms extending rearwardly and downwardly.

12. The headphone stand as recited in claim 11, wherein the upstanding walls are spaced unevenly so that one of the slots is larger than another of the slots so that they are adapted for accommodating different sized smartphones and tablets.

13. The headphone stand as recited in claim 12, further comprising a lower rear finger extending rearwardly below the top rear finger, and a lower front finger extending forwardly below the top front finger; wherein the top front finger, the top rear finger, and the lower rear finger are angled upwardly; and wherein the lower front finger extends substantially horizontally.

14. The headphone stand as recited in claim 13, wherein at least one of the fingers of each end plate has a hooked end and at least one notch.

* * * * *